United States Patent [19]

Koudstaal et al.

[11] Patent Number: 4,556,349
[45] Date of Patent: Dec. 3, 1985

[54] PARTITION FOR A CARGO CARRIER FOR BULK FREIGHT

[75] Inventors: Willem Koudstaal, Vinkeveen; Willem L. Streefkerk, Zeist, both of Netherlands

[73] Assignee: Koninklijke Emballage Industrie Van Leer B.V., Amstelveen, Netherlands

[21] Appl. No.: 489,762

[22] Filed: Apr. 29, 1983

[51] Int. Cl.⁴ .............................................. B60P 7/14
[52] U.S. Cl. .................................... 410/140; 410/129
[58] Field of Search ....................... 410/129, 140, 121; 105/355, 423

[56] References Cited

U.S. PATENT DOCUMENTS

| | | | |
|---|---|---|---|
| 2,895,431 | 7/1959 | Ford | 410/129 |
| 2,949,866 | 8/1960 | Ford | 410/129 X |
| 2,989,011 | 6/1961 | Henrikson | 410/140 |
| 3,164,395 | 1/1965 | Burch et al. | 410/135 |
| 3,297,175 | 1/1967 | Gooding | 410/129 |
| 3,866,544 | 2/1975 | Rothell | 410/129 |
| 4,124,136 | 11/1978 | Bjelland et al. | 410/129 X |

FOREIGN PATENT DOCUMENTS

| | | | |
|---|---|---|---|
| 647107 | 8/1962 | Canada | 410/129 |
| 1475369 | 3/1967 | France | |
| 8102845 | 5/1982 | Netherlands | |
| 390785 | 8/1965 | Switzerland | |

Primary Examiner—Randolph A. Reese
Assistant Examiner—David F. Hubbuch
Attorney, Agent, or Firm—Brumbaugh, Graves, Donohue & Raymond

[57] ABSTRACT

A partition for a cargo carrier (1) for bulk freight. The cargo carrier is provided with an unloading opening (3) closable by a door (4') or board at the location of a partition to be positioned at the inner side thereof. The partition includes a number of profiles (8) to be positioned horizontally across the unloading opening (3) in superposed relation into two supports (4). The supports (4) are provided at the location of the walls of the cargo carrier and extend perpendicular to the plane of the unloading opening (3). Each of the supports (4) includes a plate (4) the height of which corresponds substantially with the height of the partition. The plate (4) is placed against the inner wall of the cargo carrier and has parallel to the plane of the wall of the cargo carrier a dimension such that the bulk freight urges the plate (4) against said wall by a sufficient force as to hold the plate (4) by friction. The plate (4) is provided at the edge facing to the door or board, with a vertical member (6) attached flexibly around a vertical axis to the plate (4) respectively forming part thereof. The vertical member (6) is provided with supports (16) for the horizontal profiles (8) to be positioned between the plates (4) across the unloading opening (3).

10 Claims, 6 Drawing Figures

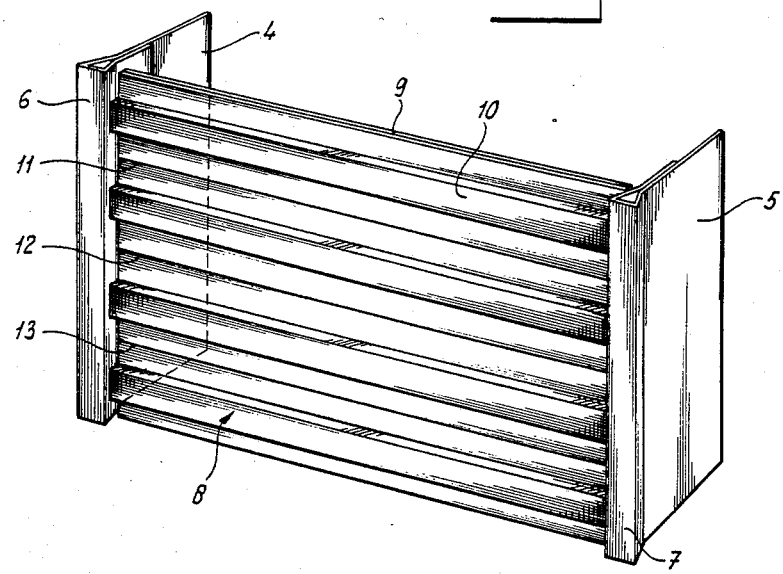
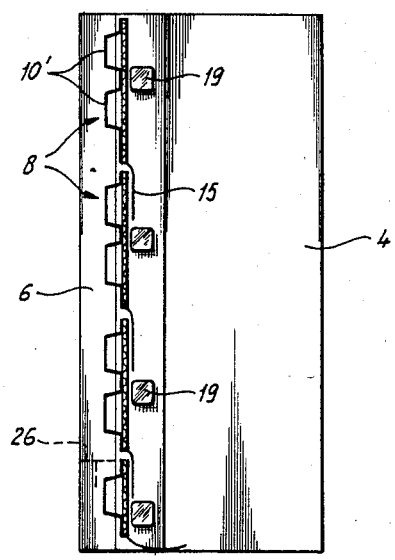

PARTITION FOR A CARGO CARRIER FOR BULK FREIGHT

The invention relates to a removable partition for a cargo carrier for bulk freight, the cargo carrier being provided with an unloading opening closable by a door or board at the location of the partition to be positioned at the inner side thereof. The partition includes a number of profiles which are positioned horizontally across the unloading opening in superposed relation in two supports, the supports being provided at the cargo carrier walls which extend perpendicular to the plane of the unloading opening.

A removable partition is known for cargo carriers in the form of containers or open cargo carriers, which consists of beams, usually made of wood, located in special supports provided at the side walls on either side of the unloading opening. Against the inner side of the partition, consisting of beams, a foil is attached in order to obtain a particle-tight seal.

Such known partitions require the aforedescribed additional structure for supporting the beams as well as provisions for obtaining a particle-tight seal. Containers and open cargon carriers respectively have inner wall constructions of different character. The provisions to be made for obtaining a removable partition need to be adapted to the construction of the cargo carrier or container and are of permanent type. Beams are heavy and frequently two men are necessary to handle them. However, it is desirable, in loading and unloading of bulk freight by means of cargo carriers or containers on vehicles, that one man, in particular the driver of the vehicle, should be able to execute all of the actions.

Moreover, removable partitions should meet the condition of being suitable for any type of loading or unloading. The loading operation can be carried out by blowing in or charging, in which case at the removable partition no leakages may occur.

The unloading may be executed by suction, by inclining the load carrier or container, in which it is emptied out through an opening in the partition, or by means of a dragging foil as disclosed in the Dutch patent application No. 8102845 not published before.

The invention is a removable partition which may be placed in any cargo carrier or container without special provisions, always provides a particle-tight seal and preferably is constructed of parts which may be handled by one man.

According to the invention, each of the supports comprise a plate, the height of which corresponds substantially to the height of the partition. Each plate is positioned against an inner wall of the cargo carrier and has, parallel to the plane of the wall of the cargo carrier, a dimension such that the bulk freight urges the plate against the wall by a force sufficient to hold the plate by friction. Each plate has, at its vertical edge facing the door or board, a hollow profile or member attached movably around a vertical axis of the plate. Each hollow profile is provided with supports for the horizontal profiles to be placed between the plates across the unloading opening, the supports engaging the profiles inwardly in the plates. Instead of support structure fixed to the inner walls for supporting the beams, the invention makes use of plates to be positioned against the inner walls and being urged against the side walls by the cargo such that the friction forces are higher than the outwards force exerted by the cargo. The edge profiles, movable around a vertical axis of the plates, project at both sides beyond the plane of the plate and thus are pressed against the side walls by urging the plates against the side walls, and thereby provide a sealing regardless the construction of the side walls. If desired said profiles may also be covered with flexible material. The horizontal profiles, preferably manufactured from a light material, are seated in the vertical profiles and said connection is preferably such that the force exerted by the cargo onto the horizontal profiles swings the vertical profiles or members outwardly promoting further the sealing.

A simple construction is obtained when the supports for the horizontal profiles are constituted by apertures in the side walls of the hollow vertical edge profiles of the plates. In particular this is the case when at the outwardly facing side the horizontal profiles are provided with tubular reinforcing profiles fitting in said supporting apertures. Then they are supported in the vertical direction while, simultaneously, they exert a moment of torque on the vertical profiles in outwards direction under influence of the pressure from the cargo.

In order to lock the horizontal profiles in their position in a simple way at the level of each supporting aperture, preferably the plates are provided with a locking cam spaced from the vertical edge profiles, and situated on the inner wall thereof, and the horizontal profiles have an elastic locking tongue at their ends protruding from the ends of the horizontal profiles which, in cooperation with the cams, lock the horizontal profiles. Each horizontal profile may be placed in the supporting aperture in a simple way, in which the locking tongue snaps behind the cams and the profiles seat in a fixed position. Of course, said profiles may be kept in their positions by the bulk freight itself, but in particular with a high partition it is preferable that the risk of the profiles falling out of the support is prevented.

The vertical hollow profiles of the plates preferably have a triangular cross-section, having the top adjacent to the plate. Such shape is suitable for obtaining a seal and provides a reliable supporting face.

Of course, one may use profiles having a circular cross-section.

Preferably, the vertical plates are implemented integrally with the vertical profiles such that at the junction of plate and profile the connection is flexible. Moreover, said flexible connection is slightly elastic preferably.

One obtains a simple and cheap construction when the vertical plates and profiles are composed of a plurality of layers of corrugated cardboard.

In order to have a light construction for the horizontal profiles, preferably, they consist of a vertical plate provided at its side to be oriented outwardly with one or more hollow tubular profiles and these are the profiles which should fit preferably in the apertures of the vertical edge profiles. Also said horizontal profiles are preferably manufactured from a plurality of layers of corrugated cardboard. Then, one has light elements which may be handled conveniently by one man.

In order to obtain a mutual seal between the horizontal profiles one may provide them with a flexible sealing strip at the lower edge extending at the inner side along a profile situated there beneath. Instead of a flexible sealing strip, of course, one may implement the horizontal profiles such that the plate-shaped parts overlap each other.

Instead of corrugated cardboard other materials are conceivable such as plastics or light metals.

The invention is hereafter described further with reference to the drawings.

FIG. 2 shows, in a perspective view, the partition according to the invention.

Figure 4:
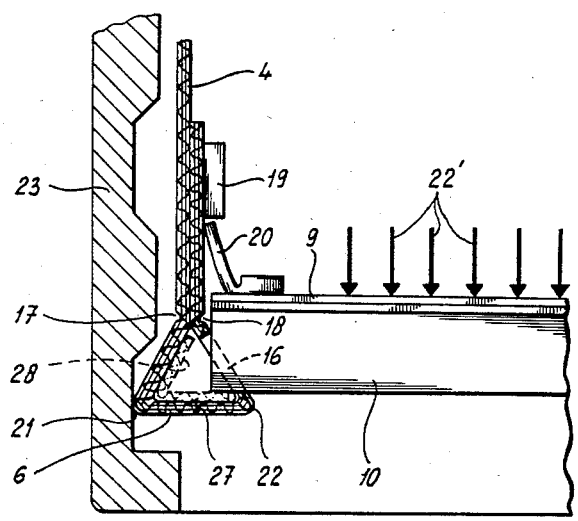
FIG. 4 is a horizontal cross-section through the connecting construction.
Figure 5:
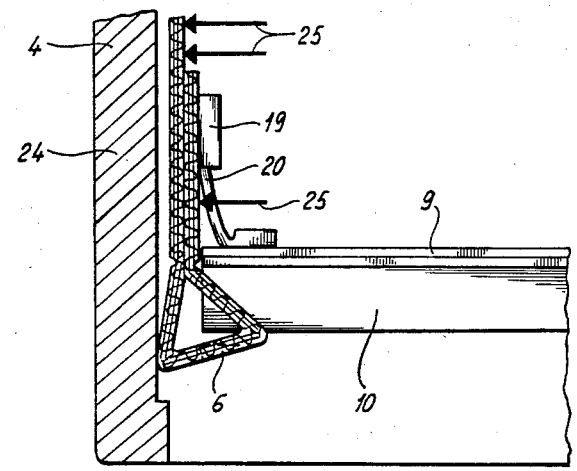

FIG. 5 corresponds to FIG. 4 in an application to another inner container wall.

FIG. 6 is a vertical cross-section in a slightly modificated embodiment.

Figure 1:
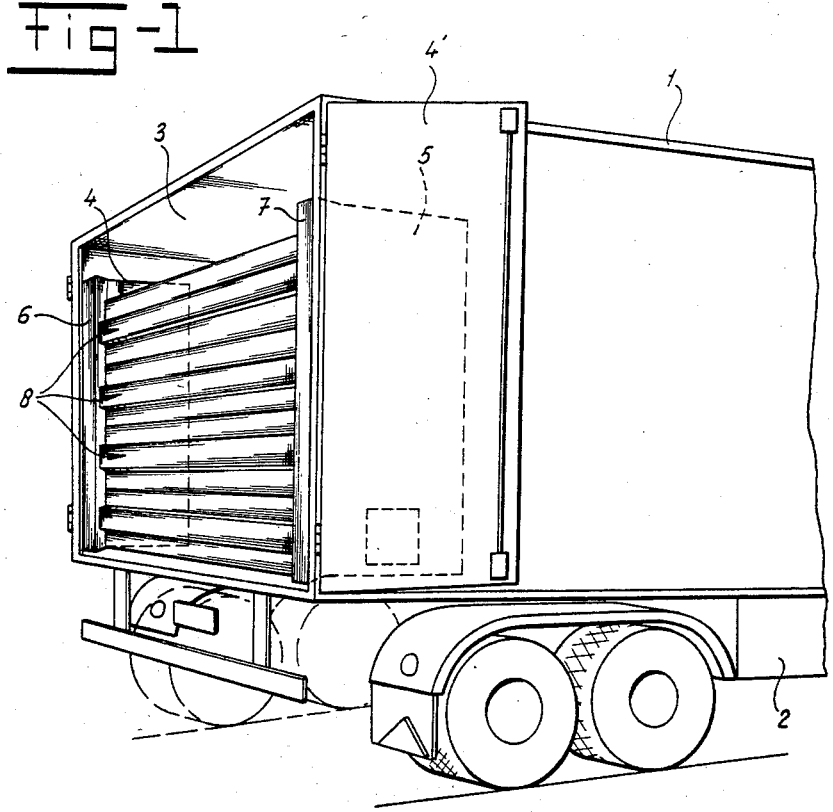
FIG. 1 shows, in perspective view, the rear part of a vehicle having a container or cargo carrier.

FIG. 1 shows the rear part of the container 1 placed on the chassis of a vehicle. Said container has at its rear end an opening 3 closable by the doors 4' shown in open condition.

The partition is releasably positioned in the rear end opening 3. It comprises vertical side plates 4 and 5, which are provided at their outwardly facing edges with a vertical profile or member 6. Between the plates 4 and 5 there are a number of horizontal profiles 8.

FIG. 2 shows slightly more clearly the plates 4 and 5, having the vertical profiles 6 and 7 of triangular cross-section. The horizontal profiles 8 comprise a plate 9 and a tubular profile 10. At 11, 12 and 13 the seams are indicated between the profiles.

Figure 3:
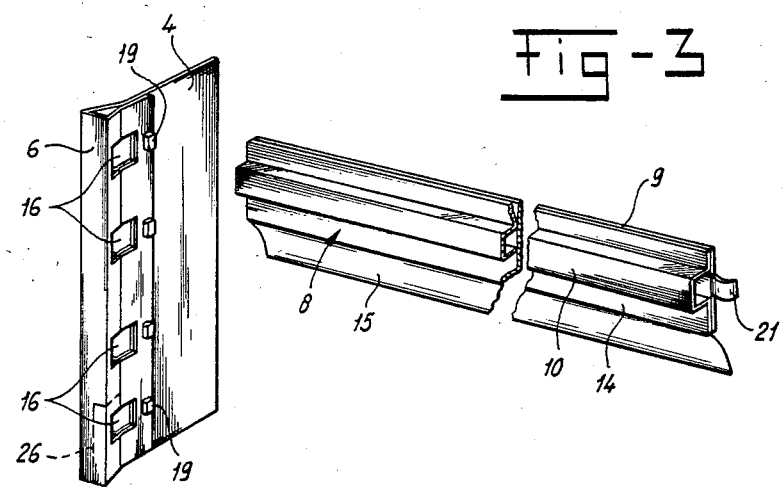
FIG. 3 shows an exploded view of two parts of said partition.

FIG. 3 shows a single profile 8 consisting of the vertical plate 9 built up from a plurality of layers of corrugated cardboard. Among said layers the outer layer 14 is reversibly bent into the U-shaped profile 10 defining a hollow tube giving the required stiffness in flexure to the whole horizontal profile 8. With 15 a flexible strip is indicated serving the sealing of the seams 11, 12 and 13 respectively.

FIG. 3 similarly shows the profile 6 of the plate 4 having apertures 16 in which the U-shaped profile 10 fits.

The fit of the horizontal profile into the vertical profile is shown even more clearly in the horizontal cross-section of FIG. 4. The plate 4 is integrally formed with the hollow vertical profile 6 of triangular cross-section and, as shown, the profile 10 is inserted into an aperture 16 of the profile 6. The plate 4 and profile 6 are composed of a plurality of layers of corrugated cardboard being impressed at top of the triangular profile 6 at 17 and 18 in order to define a flexible connection.

At the inner side of the plate 4 cams 19 are provided.

At the level of the tubular part 10 each profile 8 is provided at its ends with elastic tongues 20 and 21 respectively. In positioning a profile 8 the tongue will slide over the cam 19 and in this way as shown in FIGS. 4 and 5 snap behind the tongues by which the profile 8 is locked in its position.

FIG. 4 shows the location of the partition according to the invention in a container or cargo carrier the inner wall of which has the profile shown in FIG. 4. The profiled side wall shown is provided with recesses in which the corner 21 of the vertical profile 6 engages. When in this way the cargo exerts a pressure force as indicated by the arrows 22' on the horizontal profiles 8, a force is exerted, at 22, on the corners of the profiles, which force defines a moment with respect to the more or less elastic pivot point formed by the impressions 17 and 18, a moment pressing the corner 21 tight against the side wall 23 of the container.

FIG. 5 shows a comparable situation in a container the side wall of which has a relatively flat inner wall. The vertical profile 6 of triangular cross-section is bent slightly inwardly because of the cargo pressing the vertical plate 4 against the side wall 24 in the direction of the arrows 25.

FIG. 6 shows a vertical cross-section, with a view towards plate 4, having the profile 6. The horizontal profiles 8 are provided with two tubular parts 10'. Further it is to be seen how the sealing strip 15 extends.

FIG. 3 shows in the central part of the lower end of the vertical profile 6 a dashline 26, which line may be found in FIG. 6 similarly. Said line 26 is a perforation line provided in the cardboard. When the profile is opened along said line, the part keeping the lower horizontal profile in its position may be removed and consequently, also said lower profile. In this way the unloading is allowed in a very simple way, because the removed lower horizontal profile leaves an opening through which the bulk freight can be sucked away or flow out, or through which a dragging foil may be drawn.

If such is done, the vertical profile is not reuseable.

Of course, it is conceivable to make use of a lockable pivoting part instead of a portion to be cut away at said location.

It is also conceivable to provide the vertical profiles 6 and 7, in both of the legs of triangular cross-section extending to the top, with apertures 16 through which the side plates 4 and 5 may be used twice, also after cutting out the lower part according to the line 26.

Further it is conceivable to continue the aperture 16 around the corner 22 up to the line 27 in FIG. 4 and to provide in the cavity of the profiles 6 and 7 respectively a profiled bar 28 as indicated by dash lines in FIG. 4. By pulling it upwardly subsequent unlocking of the horizontal profiles 8 takes place. Said pulling upwardly may be carried out without problems in a cargo carrier being open at the upper side.

Therefore, based on the principle of the invention it is allowed to position within each cargo carrier or container an end partition ensuring a particle-tight seal for the bulk freight and permitting handling by one man. Said end partition may be very cheap so that after used once may be thrown away without problems, but it may also according to the construction be implemented with slightly higher costs such that it may be used one or several times up to an unlimited number of times.

We claim:

1. A partition for use in a cargo carrier having an unloading opening and opposed inner side walls, said partition being adapted to be positioned inside said carrier, at the location of said opening, for containing bulk freight, wherein said partition comprises a plurality of profiles and a pair of supports for supporting said profiles, wherein each support includes:

a plate, the height of which corresponds substantially to the height of the partition, said plate having a dimension that, when placed against an inner wall of a cargo carrier, the lateral force of bulk cargo presses the plate against said wall with force sufficient to hold the plate by friction; and a hollow vertical member flexibly attached to said plate along a vertical edge thereof, for movement about a vertical axis, wherein the hollow vertical members include support means for detachably engaging said profiles for horizontally positioning said profiles in superposed relation, and wherein said support means are spaced inwardly of said plates when said plates are positioned against opposed side walls such that force of bulk cargo against said profiles imparts a moment of torque on said hollow vertical members outwardly about their respective axes to press into the side walls of the carrier.

2. A partition as defined in claim 1, wherein said hollow vertical members are triangular in cross-section, the top of which engages said plate.

3. A partition as defined in claim 1 or 2, wherein the support means for the horizontal profiles constitute apertures in the hollow vertical members.

4. A partition as defined in claim 3, wherein said plates have facing inner walls, and comprising locking cam means on said inner walls spaced from said hollow vertical members at the level of each supporting aperture, and comprising elastic locking tongues, on opposite end portions of said horizontal profiles, for locking the horizontal profiles in cooperation with said cams.

5. A partition as defined in claim 3, wherein each horizontal profile includes an elongated plate with at least one hollow tube at the side to be oriented outwardly, and wherein the hollow tubes fit with their ends in the apertures of the hollow vertical members.

6. A partition as defined in claim 5, wherein the horizontal profiles are formed of a plurality of layers of corrugated cardboard.

7. A partition as defined in claim 1 or 2, wherein said plates are integrally formed with said hollow vertical members, with a junction between the plate and respective vertical member having a flexible interconnection.

8. A partition as defined in claim 7, wherein the plates and hollow vertical members are composed of a plurality of layers of corrugated cardboard.

9. A partition as defined in claim 1 or 2, wherein each horizontal profile includes an elongated plate with at least one hollow tube at the side to be oriented outwardly.

10. A partition as defined in claim 1, wherein each horizontal profile has a flexible sealing strip at its lower edge adapted to overlie and seal an adjacent horizontal profile.

* * * * *